United States Patent
Mounts, Jr.

(10) Patent No.: US 10,553,128 B2
(45) Date of Patent: Feb. 4, 2020

(54) SYSTEM, DEVICE, AND METHOD FOR WATER ROLLOVER SIMULATION

(71) Applicant: The Government of the United States of America, as represented by the Secretary of Homeland Security, Washington, DC (US)

(72) Inventor: Jack B. Mounts, Jr., Glynco, GA (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 632 days.

(21) Appl. No.: 15/070,662

(22) Filed: Mar. 15, 2016

(65) Prior Publication Data

US 2017/0270813 A1    Sep. 21, 2017

(51) Int. Cl.
| | |
|---|---|
| *G09B 9/06* | (2006.01) |
| *G09B 9/02* | (2006.01) |
| *G09B 9/00* | (2006.01) |
| *G09B 9/042* | (2006.01) |
| G09B 9/052 | (2006.01) |
| G09B 9/08 | (2006.01) |

(52) U.S. Cl.
CPC ............... *G09B 9/06* (2013.01); *G09B 9/00* (2013.01); *G09B 9/003* (2013.01); *G09B 9/02* (2013.01); *G09B 9/042* (2013.01); *G09B 9/052* (2013.01); *G09B 9/085* (2013.01)

(58) Field of Classification Search
CPC . G09B 9/00; G09B 9/003; G09B 9/02; G09B 9/042; G09B 9/052; G09B 9/085; G09B 9/06
See application file for complete search history.

(56) References Cited

U.S. PATENT DOCUMENTS 7,213,798 B1 * 5/2007 Thompson .............. B66C 13/02
114/344

\* cited by examiner

*Primary Examiner* — James B Hull
(74) *Attorney, Agent, or Firm* — Lavanya Ratnam; Kelly G. Hyndman

(57) ABSTRACT

A water rollover simulation system includes a simulation training device. The simulation training device is connected to a track, wherein one end of the track is submerged in water. The simulation training device begins a simulation on another portion of the track not submerged in water, moves toward the end of the track, and completes the simulation by allowing one or more trainees to escape the simulation training device while the simulation training device is submerged under water. The water rollover simulation system includes various safety features. The safety features can be activated automatically after a predetermined amount of time, or manually via a remote control system.

20 Claims, 8 Drawing Sheets

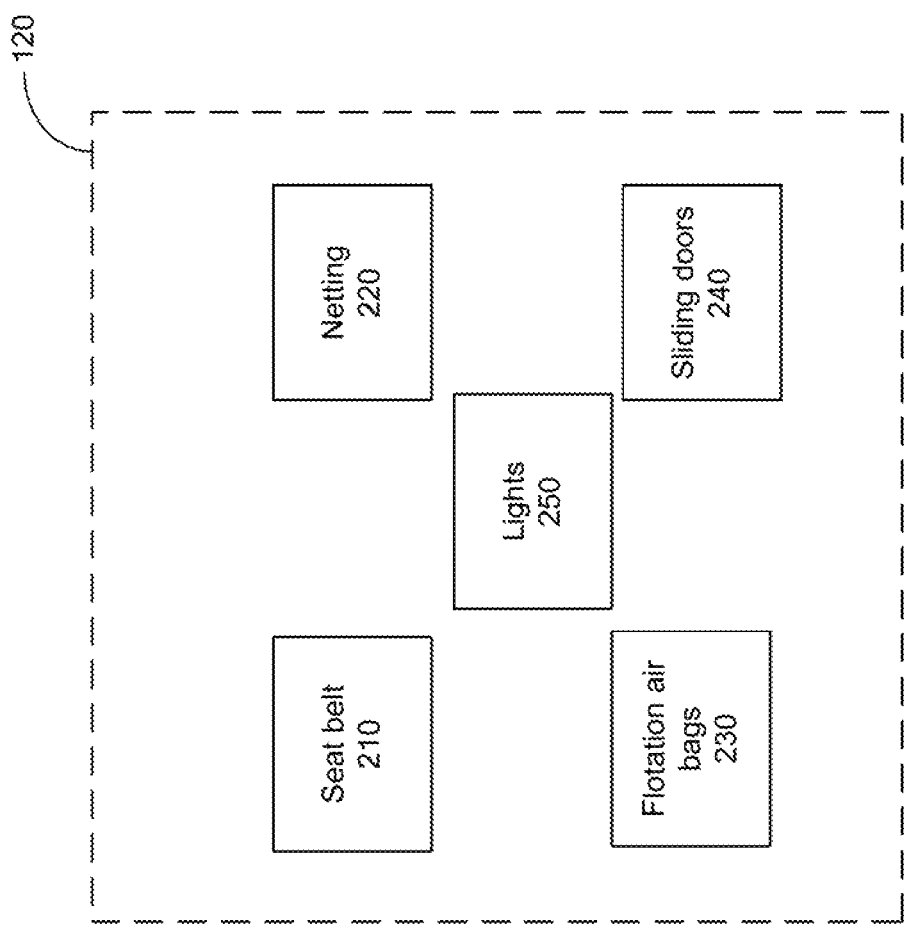

SYSTEM, DEVICE, AND METHOD FOR WATER ROLLOVER SIMULATION

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Simulations are used for training for various real life scenarios. Real life scenarios may be dangerous, high stress, include unexpected deviations, and the like. Training via simulations can significantly improve success in the real life scenarios by teaching and practicing what to expect and how to adapt to various situations. Simulations, however, in their own right can present dangerous, high stress scenarios.

SUMMARY

The foregoing paragraphs and immediately following paragraph have been provided by way of general introduction, and are not intended to limit the scope of the claims. The described embodiments, together with further advantages, will be best understood by reference to the following detailed description taken in conjunction with the accompanying drawings.

Water rollover simulation systems can be used to train personnel about situation where the trainee submerged (either partially or fully) in, for example, a vehicle. This is very important training as most individuals do not encounter such situations in everyday life. In embodiments, a simulation system mimics such a situation by moving the rollover simulation device from a starting point, where the starting point is not submerged in water, to an ending point of the simulation, such as where the device, including the persons being trained, is submerged in a pool of water. The simulation permits the trainee to practice exiting the device under water, or at least partially underwater, so he/she knows what to expect from such a scenario. Based on signals received from a plurality of sensors and/or signals received from a remote control device, the water rollover simulation system can deploy various safety features when required to do so.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 depicts a block diagram of a safety system according to a non-limiting embodiment of the disclosed subject matter.

DETAILED DESCRIPTION

Figure 1:
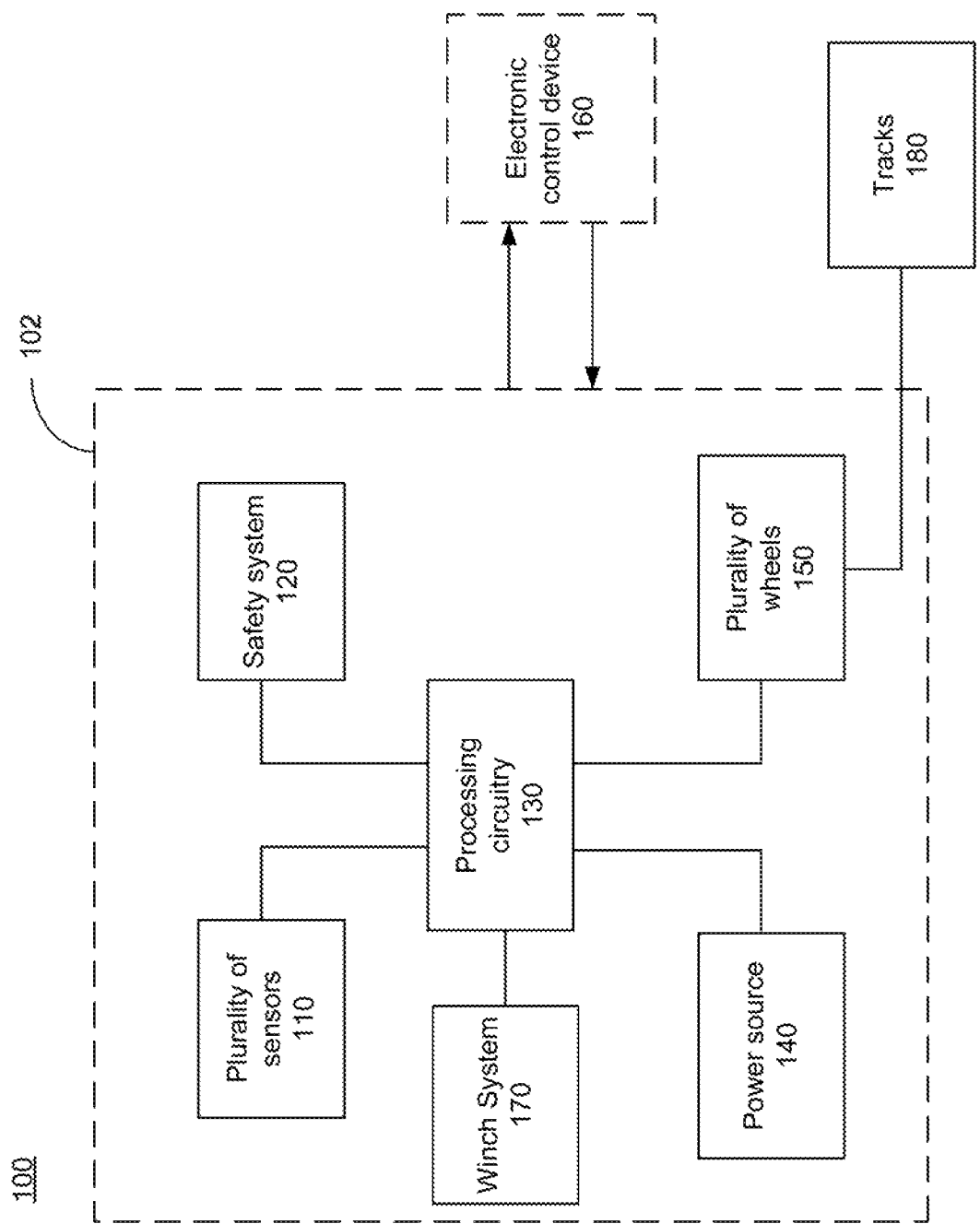
FIG. 1 depicts a block diagram of a water rollover simulation system according to one or more embodiments of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, routine structures and components may be shown in block form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "top," "front," "side," "length" and the like used herein, merely describe points of reference and do not necessarily limit embodiments of the disclosed subject matter to any particular orientation or configuration. Furthermore, terms such as "first" and "second" etc., merely identify one of a number of portions, components, points of reference, operations and/or functions as described herein, and likewise do not necessarily limit embodiments of the disclosed subject matter to any particular configuration or orientation or order of priority.

Referring now to the drawings, wherein like reference numerals designate identical or corresponding parts throughout the several views.

FIG. 1 is a block diagram of a water rollover simulation system 100 (herein referred to as system 100) according to one or more embodiments of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can include a plurality of sensors 110, a safety system 120, processing circuitry 130 (which can include internal and/or external memory), a power source 140, a plurality of wheels 150, a winch system 170, and tracks 180. Optionally, system 100 can include an electronic control device 160 to control one or more portions of the system 100, for instance, via wired connection or wirelessly. In one or more embodiments, the plurality of sensors 110, the safety system 120, the processing circuitry 130, the power source 140, and the plurality of wheels 150 can be implemented in a simulation training device 102 (herein referred to as device 102), for example. Further, the aforementioned components can be electrically connected or in electrical or electronic communication with each other as diagrammatically represented by FIG. 1, for example.

Generally speaking, system 100 is operable to cause the device 102 to simulate water rescue scenarios by moving the device 102 from a starting point of the simulation, wherein the starting point is not submerged in water, to an ending point of the simulation, wherein the ending point is associated with the device to be submerged or at least partially submerged in water. Based on signals received from the plurality of sensors 110 and/or signals received from the electronic control device 160, the system 100 can deploy safety features from the safety system 120.

More specifically, based on various received signals (e.g., from the plurality of sensors 110, electronic control device 160, etc.), the system 100 can perform a water rollover simulation by causing the device 102 to travel a predetermined length of the track 180 into a body of water, such as a pool, for example. While submerged or partially submerged, the one or more trainees undergoing the simulation can exit the device 102, by opening one or more sliding doors, for example. Additionally, alternative exits are available should the exit fail. The safety system 120 can also provide alternative exits and safety features configured to assist the one or more trainees undergoing the simulation.

The plurality of sensors 110 can include various sensors to detect motion, oxygen levels of a trainee undergoing the simulation, detect water, and the like as further described herein. The types of the plurality of sensors 110 can include an accelerometer, an imaging device, pulse oximetry, a water detection sensor, and the like. Multiple of the same of different sensor types of the foregoing may be implemented.

An accelerometer can be used to monitor the stability of the device 102, for example, including recording and/or monitoring the impact of the device entering the water during the simulation. Similarly, the imaging device, the pulse oximetry, and the water detection sensor can be used to monitor the status of the device 102 and/or the trainee undergoing the simulation using the device 102.

The safety system 120 in embodiments include various safety features to increase the safety of the system 100 as described herein.

The processor or processing circuitry 130 can carry out instructions, e.g., constructed to perform functions such as by being programmed with an algorithm to operate in a manner consistent with this disclosure, to perform or cause performance of various functions, operations, steps or processes of the system 100. The processor/processing circuitry 130 can be configured to store information in memory, operate the system 100, control the safety system 120, control the plurality of wheels 150, receive and send information in the form of signal(s) from the plurality of sensors 110, and the like. Processor/processing circuitry 130 can also receive and/or send signals from/to the electronic control device 160.

The power source 140 can include batteries, a rechargeable battery or batteries, a fuel cell, and the like. Further, the power source 140 can provide electricity to operate various components of the system 100, including the plurality of sensors 110, the safety system 120, the processing circuitry 130, the plurality of wheels 150, the winch system 170, and the track 180.

Optionally, the system 100 can include electronic control device 160. Electronic control device 160 can be communicably coupled to device 102, either via wiring and/or wirelessly, to control the system 100. Optionally, the electronic control device 160 can receive signals from device 102. For example, the received signals can be representative of signal(s) to control various aspects of the system 100 including the safety system 120, the plurality of wheels 150, the winch system 170, and an operating status of one or more components of the device 102, such as battery level, warning of low oxygen of a trainee via the plurality of sensors 110, error signals, etc. The electronic control device 160 can include a remote control, a smart phone, a tablet, a joystick, combinations thereof, and the like. The electronic control device 160 can cause the device 102 to move in correspondence therewith, as well as implement safety features of the safety system 120, activate the winch system 170, and the like. The electronic control device 160 can stop, slow down, maintain speed of, or speed up, the device 102 based on the signal(s) from the electronic control device 160 via the plurality of wheels 150. Additionally, the electronic control device 160 can operate the safety system 120, the winch system 170, the tracks 180, and the like.

FIG. 2 depicts a block diagram of the safety system 120 according to one or more embodiments of the disclose subject matter. Generally speaking, the safety system 120 can implement various features to improve the safety of the water rollover simulation. More specifically, the safety system 120 can include a seat belt 210, netting 220, flotation airbags 230, sliding doors 240, and one or more lights 250. The seat belt 210 can include an automatic or actionable release mechanism, such as a pelican hook style quick release which may include a lanyard actuator. The mechanism may be actuated by the trainee undergoing the simulation or an instructor, a rescue diver, remotely via the electronic control device 160, and the like. Similarly, the netting 220 can cover at least a portion of the device 102 and can be secured to the device 102 via the automatic release mechanism, so the netting 220 can be caused to automatically release and/or caused to release via the electronic control device 160, for example. The netting can be mesh, for example, to allow water to enter the device 102 while still providing support to prevent the trainee from falling out of the device 102. The flotation airbags 230 may fill with air to cause the device 102 to ascend to a surface of the water, for example, in an emergency situation. It should be appreciated that the number of flotation air bags may vary based on the size of the device 102. The sliding doors 240 can be used to exit the device 102 as part of the simulation as a first preferred exit based on the simulation and/or in an emergency. The sliding doors 240 can be attached to the device 102 so the sliding doors 240 can include an automatic sliding door mechanism to automatically open the sliding doors 240 in the event of an emergency. The sliding doors 240 can be caused to open automatically in response to signals from the plurality of sensors 110 and/or remotely via the electronic control device 160. Similarly, the automatic release mechanism of the seat belt 210 and the netting 220, and the flotation airbags 230 can be activated automatically in response to signals received from the plurality of sensors 110 and/or the electronic control device 160.

Figure 3A:
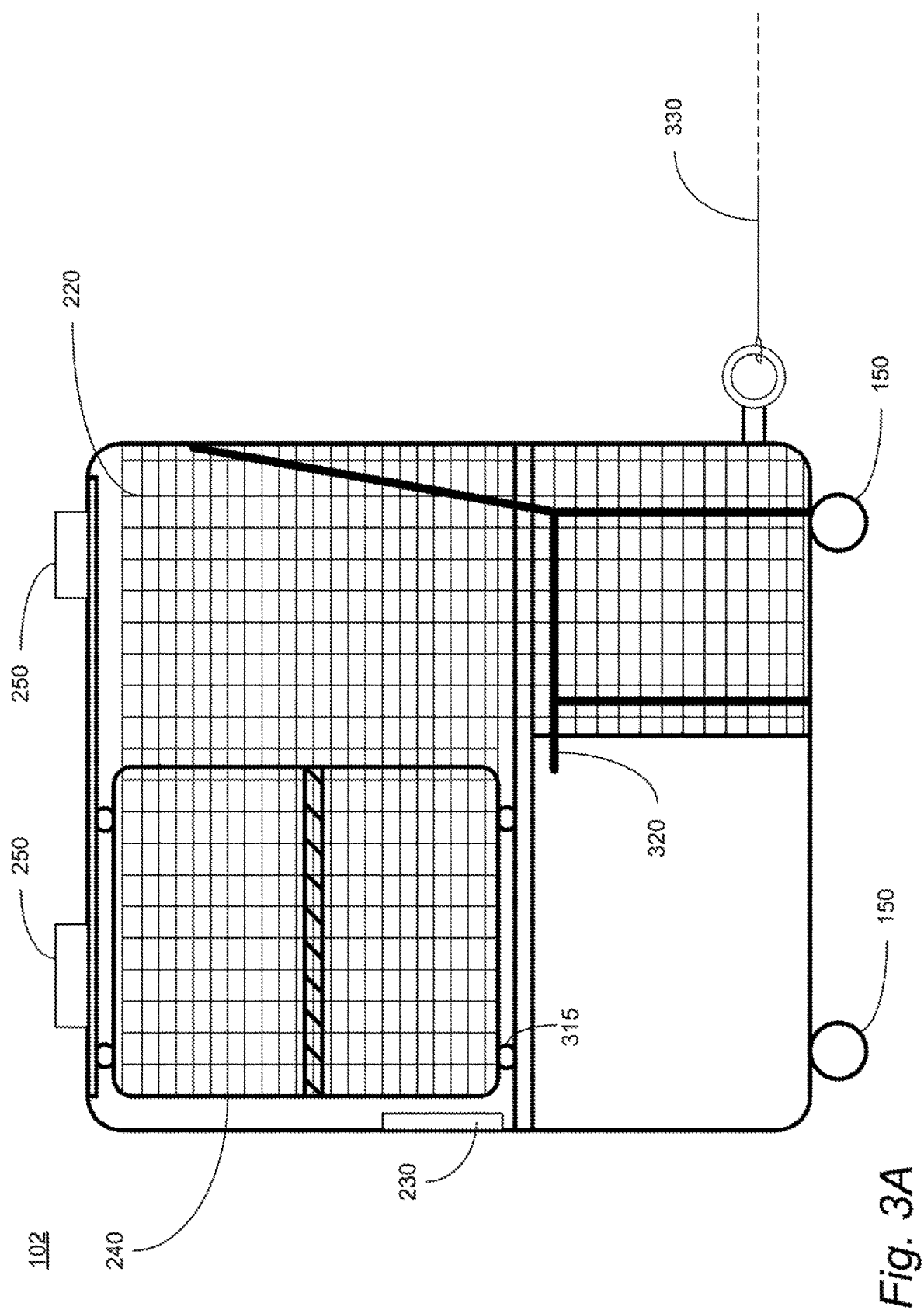
FIG. 3A depicts a side view of water rollover simulation device according to one or more embodiments of the disclosed subject matter.

FIG. 3A depicts a side view of the device 102 according to one or more embodiments of the disclosed subject matter. The device 102 can include the plurality of wheels 150 supporting the device 102. Although two wheels are depicted, it should be appreciated that the plurality of wheels can include any number of wheels that sufficiently provide support and balance for the device 102. The device 102 can also include netting 220 covering at least a portion of the device 102. For example, the netting can cover one or more sides of the device 102 so the trainee undergoing the simulation does not exit the device 102. The device 102 may also include a sliding door 240 including wheels 315. The sliding doors wheels 315 in embodiments include motors and can be actuated automatically in response to the plurality of sensors 110 and/or via the electronic control device 160. Additionally, the device 102 can include one or more seats 320 to provide a starting point or support for the trainee undergoing the simulation to execute the simulation. The device 102 can also include a winch cable 330 mechanically coupled to the device 102. In these embodiments, the winch cable 330 can be mechanically coupled to the device 102 through various connections including a ring, a hook, welded, tied, and the like as would be known to one of ordinary skill in the art. Additionally, the device 102 can include lights 250 disposed in various locations on the device 102 to be used as an alert mechanism by flashing in a predetermined sequence and/or color to alert an emergency team, for example.

Figure 3B:
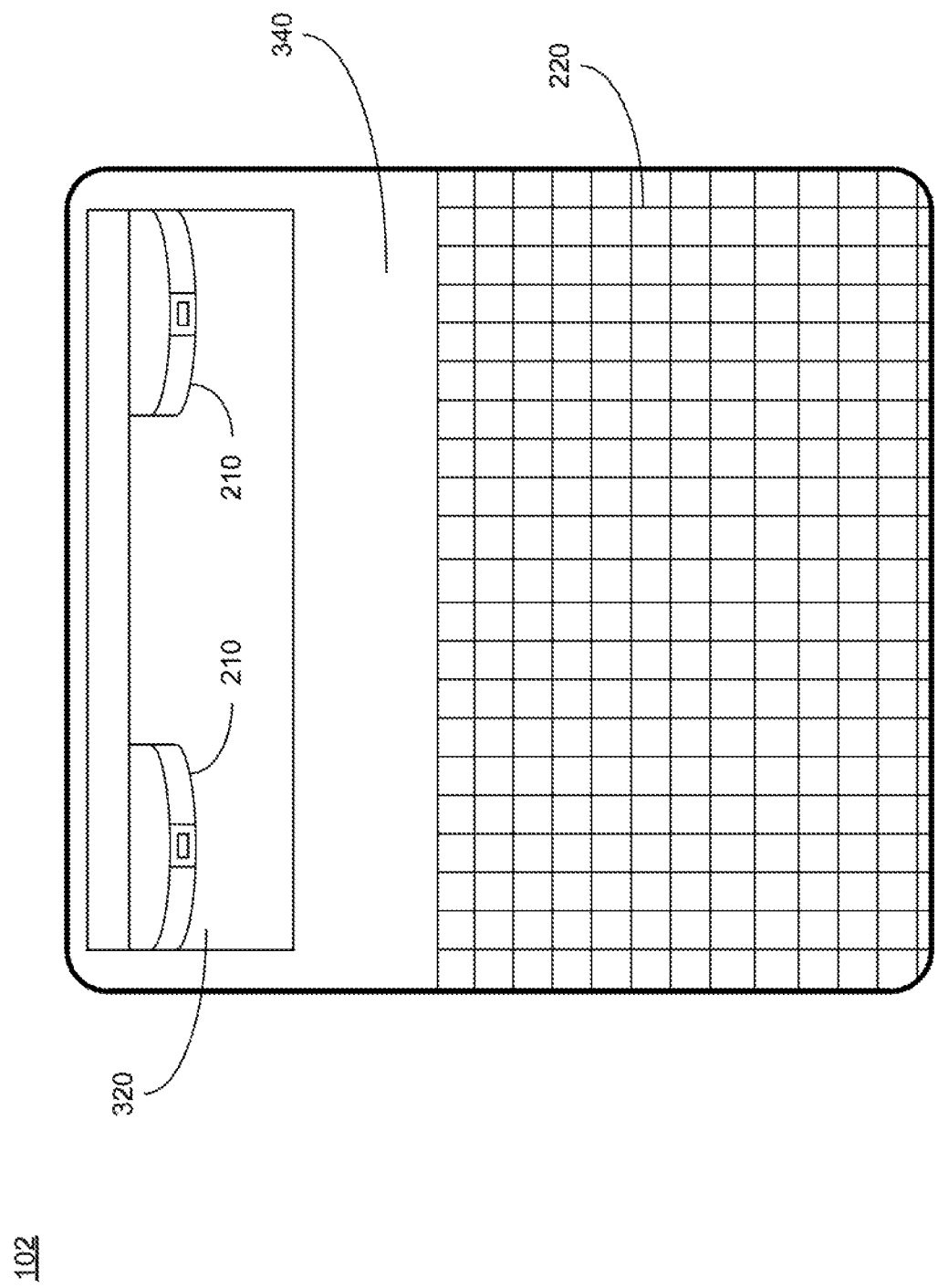
FIG. 3B depicts an aerial view of the water rollover simulation device according to one or more embodiments of the disclosed subject matter.

FIG. 3B depicts an aerial view of the device 102 according to one or more embodiments of the disclosed subject matter. The device 102 can include the netting 220 covering at least a portion of the top of the device 102. The device 102 can include a top opening 340 in the top of the device 102 not covered by netting 220. The top opening 340 can be used as an alternative exit in an emergency situation if the first preferred exit fails, for example. Additionally, the seatbelt(s) 210 may be attached to seating 320 to secure a trainee during the simulation is in progress, and provides an additional aspect of the simulation as the seatbelt 210 must be removed before exiting the device 102.

Figure 4A:
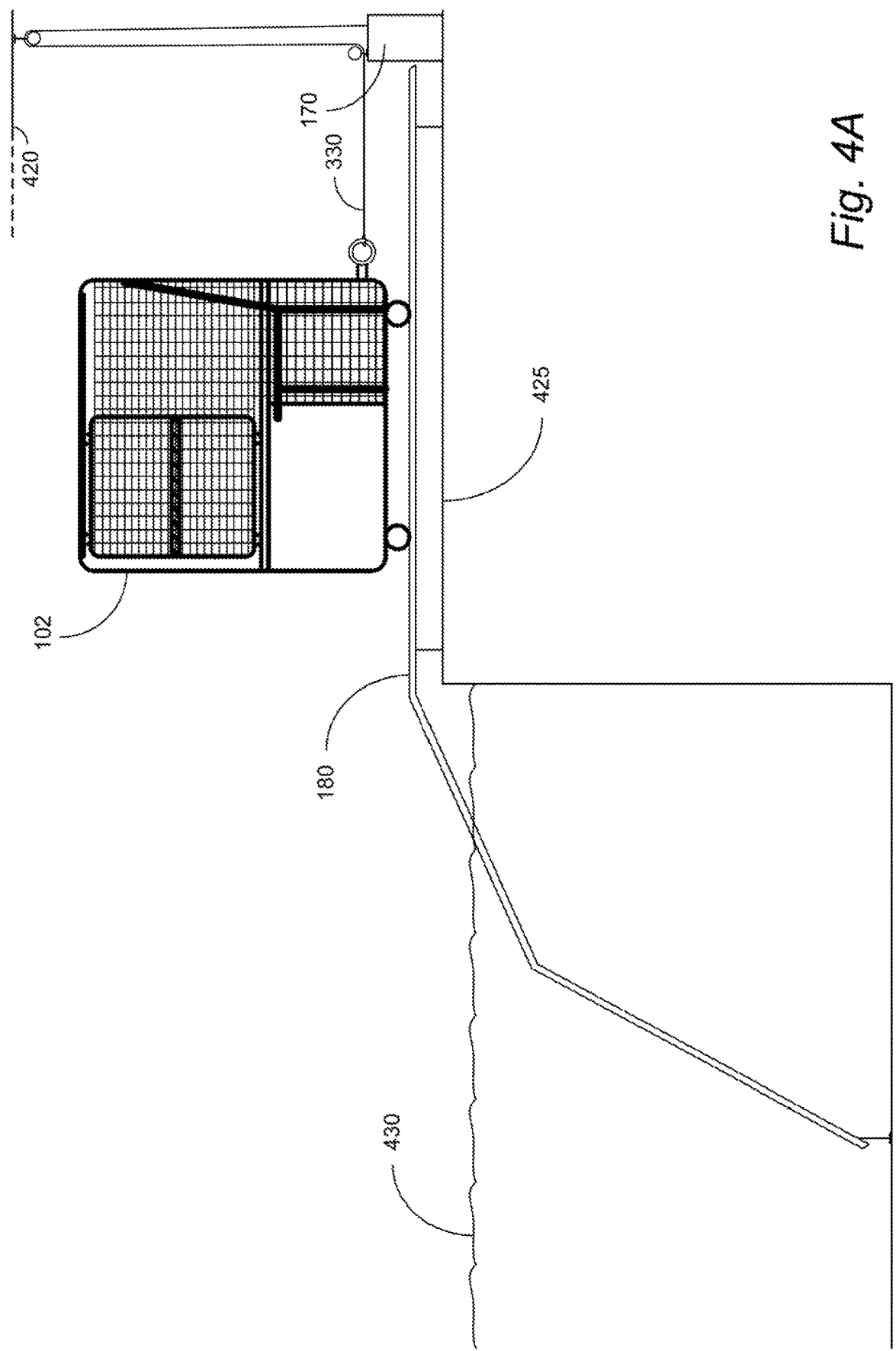
FIG. 4A depicts an overview of the water rollover simulation system where the water rollover simulation device is at a starting point of a simulation according to one or more embodiments of the disclosed subject matter.

FIG. 4A depicts an overview of the system 100 where the device 102 is in a starting position according to one or more embodiments of the disclosed subject matter. The device 102 is in a starting position on the track 180. The device 102 can be connected to the winch system 170 so a portion of the winch system 170 can be connected to a ceiling 420 and a portion of the winch system 170 can be connected to the device 102 via the winch cable 330.

The device 102 can be connected to the track 180 at a predetermined starting position on the track 180. The track 180 can include a predetermined number of angles so the track includes at least one decline at a predetermined position on the track 180, thereby allowing the device 102 traveling along the track 180 to travel to a fully submerged position. For example, the track 180 can include two angles. A first angle can be at or adjacent to an edge of a pool deck 425, and a second angle can be submerged under the pool surface 430, e.g., a surface of water included in the pool. The first and second angle can cause the track 180 to decline, e.g., relative to the pool, so the device 102 can be submerged in the water by traveling to an ending position of the track 180. The track 180 can be adjusted, via the first and second angle, for example, to accommodate one more locations varying in size, pool depth, and the like, or if the simulation requires a steeper descent into the water, for example.

Figure 4B:
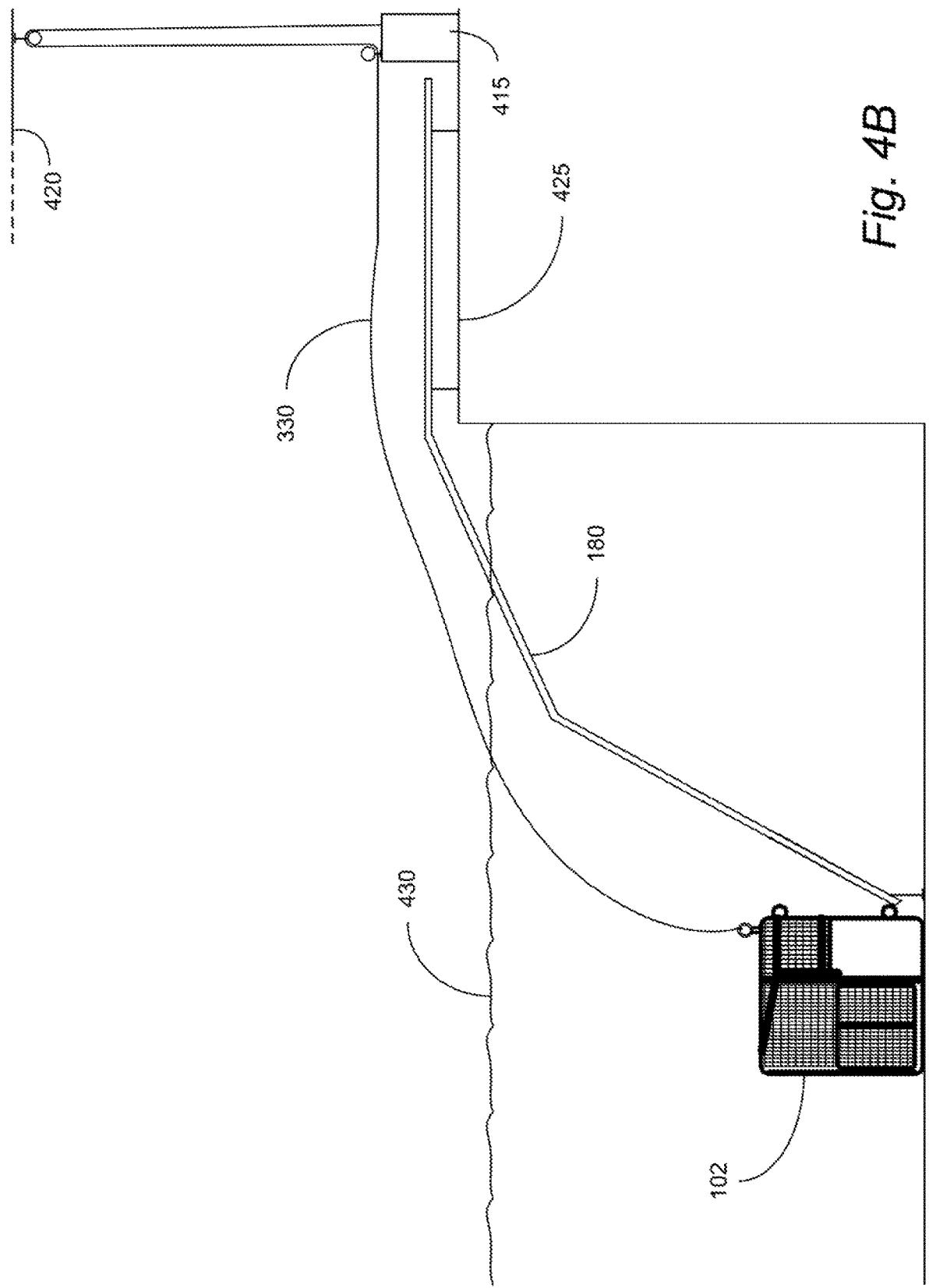
FIG. 4B depicts an overview of the water rollover simulation system where the water rollover simulation device is at an ending point of the simulation according to one or more embodiments of the disclosed subject matter.

FIG. 4B depicts an overview of the system 100 where the device 102 is in an ending position on the track 180 according to one or more embodiments of the disclosed subject matter. As the device 102 moves from the starting position toward the ending position on the track 180, the device 102 can be submerged under the pool surface 430. The winch system 170 can release a predetermined length of winch cable 330 to allow the device 102 to reach the ending position on the track 180 without any resistance from the winch system 170. As the device 102 reaches the ending position of the track 180, the device 102 in embodiments the device is constructed to tip forward (e.g., to act as a hinge) via a first set of the plurality of wheels 150 supporting a front end of the device 102, so the first set of wheels can function so wheels coupled to the track 180 on a first end permit the device to pivot relative to the track 180. For example, a wheel assembly includes one or more wheels that oppose one or more wheels with a rail included in the track disposed therebetween such as in a rollercoaster type wheel assembly configuration. In this instance, the device is pivotally mounted to the assembly, e.g., to a bracket included in the assembly. Additionally, a second set of wheels of the plurality of wheels 150 can support a back end of the device 102, and be releasably connected to the track 180. Therefore, the device 102 can tip forward so the front end of the device 102 can be substantially perpendicular to the pool surface 430, which can be part of the simulation, for example. After the simulation has ended, the winch system 170 can return the device 102 to the starting position on the track 180 from the ending position on the track 180.

Figure 5:
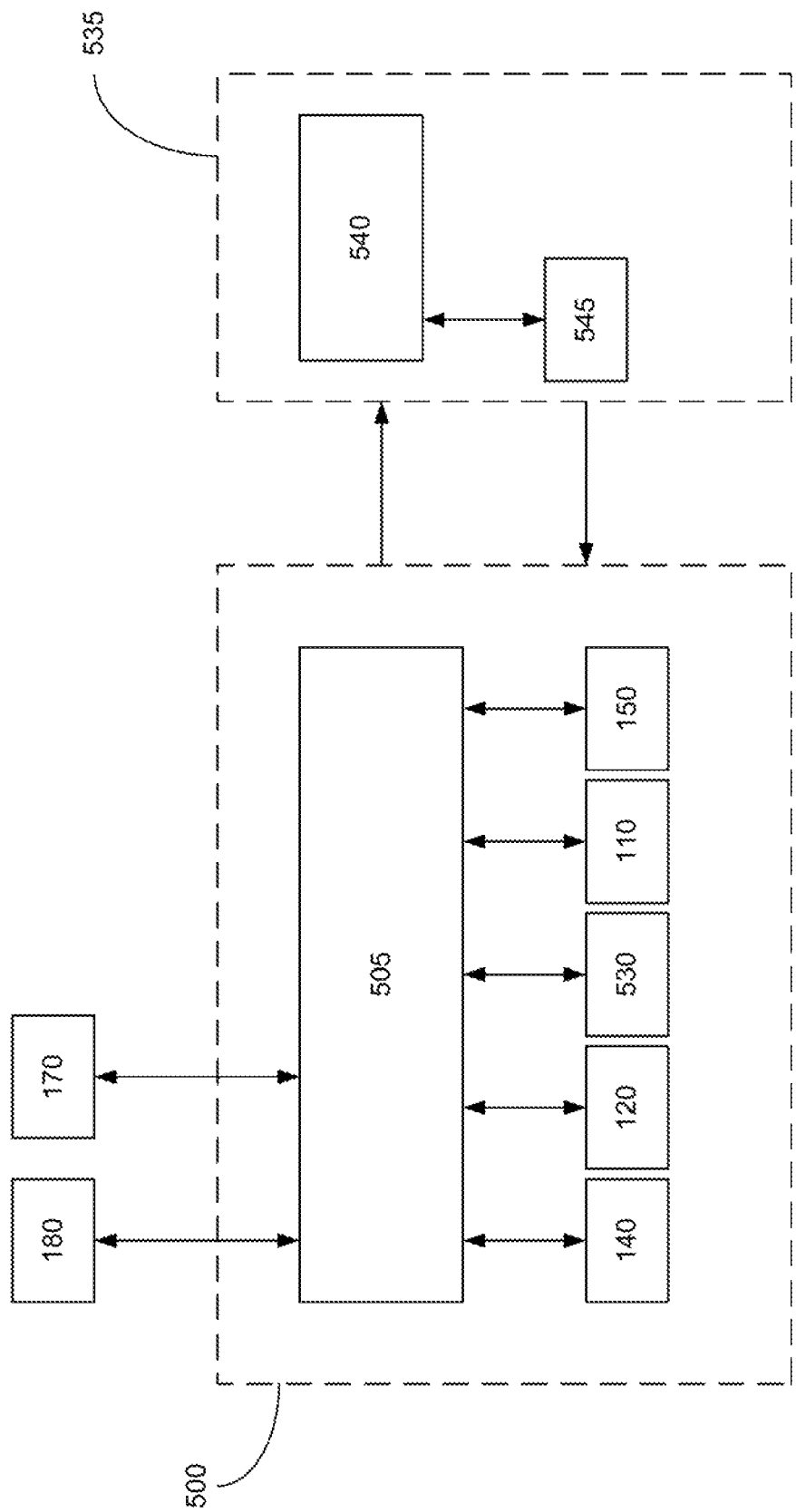
FIG. 5 depicts an exemplary control system of the water rollover simulation system.

FIG. 5 depicts control aspects of a system 500 according to embodiments of this disclosure. Optionally, system 500 can represent control aspects (e.g., controlee components and controller components) of system 100 for FIG. 1.

In FIG. 5, the system 500 can include a control circuit 505, the plurality of sensors 110, the safety system 120, the power source 140, the plurality of wheels 150, the winch system 170, the tracks 180, a wireless receiver/transmitter 530, and a remote control system 535.

The control circuit 505, in embodiment, is representative of processor/processing circuitry 130, can be configured to perform or cause performance of multiple functions, including receiving, monitoring, recording, storing, indexing, processing, and/or communicating data. The control circuit 505 can be integrated as one or more components, including memory, a central processing unit (CPU), application specific integrated circuit (ASIC), input/output (I/O) devices or any other components that may be used to run an application. The control circuit 505 can be programmed to execute a set of predetermined instructions. Various instructions including lookup tables, maps, and mathematical equations can be stored in memory, however, it should be appreciated that the storing or reading of such information can be accomplished with alternative types of computer-readable media including hard disks, floppy disks, optical media, CD-ROM, or other forms of RAM or ROM. Additionally, other circuitry including power supply circuitry, signal-conditioning circuitry, solenoid driver circuitry, and communication circuitry can be included in the control circuit 505. Further, it should be appreciated that the control circuit 505 can include multiple controllers wherein each controller is dedicated to perform one or more of the above mentioned functions.

In embodiments, the system 100 is controlled remotely by a remote control system 535 communicably coupled to the control system 500, e.g., a wireless RF communication link.

The control circuit 505, in embodiments such as this, is communicatively coupled to the plurality of sensors 110. Each of the sensors 110 provides output signals indicative of parameters related to the environment of the device 102 via the system 100. Individual sensors in the plurality of sensors 110 can be located in various positions on the device 102, such as on the seating 320, the sliding door 240, the netting 220, and the like, for example. The control circuit 505 is constructed to receive signals from each of the plurality of sensors 110.

In one or more embodiments, the power source 140 includes a rechargeable battery, which is integrated electrically within the system 100. The control circuit 505 can be configured to regulate and appropriately distribute the power supplied by the power source 140. It should be appreciated that the rechargeable battery can be recharged through a variety of recharging methods including plugging into an electrical outlet or being electrically coupled with an integrated solar panel, for example.

The control system 500 can be configured to wired and/or wirelessly receive signals from the remote control system 535, which may be representative of the electronic control device 160, through a communicably coupled receiver/transmitter 530. Wireless communication can be any suitable form of wireless communication including radio communication, a cellular network, or satellite-based communication. The remote control system 535 can include a display 540, a first user input device 545, such as a keyboard, a joystick, keypad, mouse, touch screen interface of display 540, or combination of two or more thereof. The remote control system 535 can be various devices capable of wireless communication, including a personal computer, laptop, smart phone, tablet, or remote control. The remote control system 535 can be used to program the control circuit 505 to execute a predetermined set of instructions. Further, the remote control system 535 can allow a user to remotely control various components of the system 100, such as the plurality of wheels 150, the control circuit 505, the winch system 170, etc.

Figure 6:
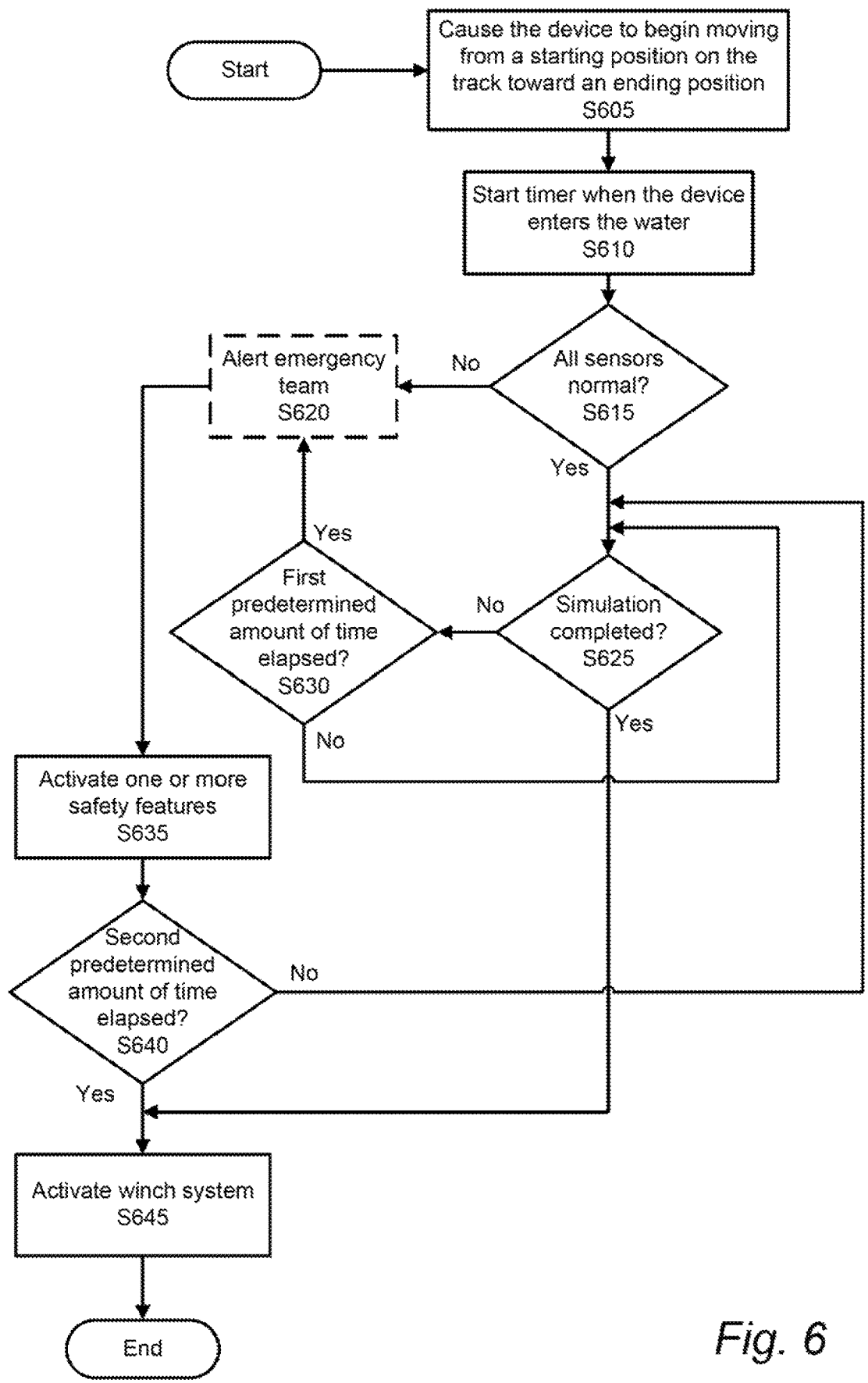
FIG. 6 is a flow chart of a method for implementing safety features in the water rollover simulation system.

FIG. 6 depicts an exemplary flow chart for implementing safety features in the system 100.

In S605, the device can begin moving from the starting position on the track 180 toward an ending position on the track 180. The movement can be caused by the control system 500, for example, or by being manually pushed down the track 180. The control system 500 controlling the plurality of wheels 150 can cause the device 102 to enter the pool surface 430 at consistently the same speed, as well as reliably alter the speed should the simulation require a different speed with which the device 102 should enter the pool, for example.

In S610, a timer can be started in response to the water detection sensor detecting when the device 102 enters the water.

In S615, it can be determined if all the sensors are within a predetermined normal range. For example, the pulse oximetry can determine if the trainee's oxygen levels are within a predetermined range, e.g., a normal range. Additionally, the imaging device can be used to identify any signs of emergency via image recognition software and/or a live stream of the trainee undergoing the simulation, for example. Also, an accelerometer can be used to determine, e.g. measure an impact, if the impact of the device entering the water is within a predetermined range, e.g., an anticipated or normal range, for example. If it is determined that the sensors are within the predetermined normal range, then it can be determined if the simulation has been completed in S625. In examples, an emergency team is alerted in S620, responsive to a determination that the sensors are not in a predetermined range, e.g., a range of normal.

In S625, a determination is made as to whether or not the simulation is complete. For example, a determination that the simulation is complete via the imaging device transmitting a live stream to the remote control device 535 where it can be viewed so a confirmation can be made that the simulation is ended. The winch system 170 can be activated at S645 to return the device 102 from the ending position on the track 180 to the starting position on the track 180 so that the simulation can be performed again, such as if the simulation is complete, for example. After the winch system 170 has been activated, thereby returning the device 102 to the beginning position of the track 180, the process can end.

However, if the simulation is not complete at S625, e.g., responsive to a determination, then a determination is made if a predetermined amount of time is met at S630, e.g. a first amount of time has elapsed.

In S630, it can be determined if a first predetermined amount of time has elapsed since the timer was started in S610, which is effectively determining how long the device 102, and therefore the trainee undergoing the simulation, have been submerged under water. The first predetermined amount of time can be based on the amount of time in which the simulation should be completed. For example, if the simulation has not been completed within the first predetermined amount of time, then something may have gone wrong with the simulation and/or there may be an emergency situation to consider. If the first predetermined amount of time has not elapsed, then the process can return to S625 to determine if the simulation has been completed. However, if the first predetermined amount of time has elapsed, then the emergency team can be alerted in S620.

In S620, the emergency team can be alerted. The emergency team may be a team of divers in the pool ready to assist the trainees in the simulation, for example, during an emergency situation. The emergency team can be alerted via a message transmitted from the control system 500, so the message was initiated automatically in response to the signals received from the plurality of sensors. Additionally, the emergency team may be alerted via the remote control device 535. Also, the emergency team may be alerted via one or more lights disposed on the device 102 that may flash in a predetermined sequence and/or color to alert an emergency team that is already submerged in the water. It should be appreciated that alerting the emergency team may be an optional step in the process. For example, the emergency team may have already been alerted depending on the various outcomes of the process. Therefore, if the emergency team has already been alerted, the emergency team may not need to be alerted again.

In S635, one or more of the safety features may be activated. For example, the seat belt 210 may activate the automatic release mechanism, the netting 220 may activate the automatic release mechanism, the flotation air bags 230 may inflate, the sliding doors 240 may activate the automatic sliding door mechanism, and the lights 250 may continue flashing and/or emit continuous light to provide additional visibility for the trainee undergoing the simulation and/or the emergency team. It should be appreciated that not all the features of the safety system 120 may be activated simultaneously, and some features may not be activated.

In S640, it can be determined if a second predetermined amount of time has elapsed since the timer was started in S610. The second predetermined amount of time can correspond to a predetermined maximum amount of time a trainee is permitted to be submerged, therefore requiring the trainee to be removed from the water in an expedited manner. If the second predetermined amount of time has not elapsed, the process returns to S625, in embodiments, to determine if the simulation is complete. However, if the second predetermined amount of time has elapsed, then the winch system 170 can be activated to return the device 102 to the starting position on the track 180, thereby removing the trainee from being submerged in the water. After the winch system 170 is activated and the device 102 is returned to the starting position on the track 180 and the process ends.

An advantage of the system 100 includes various safety features configured to automatically implement at predetermined times to prevent the trainee from being submerged for more than a predetermined amount of time. In embodiments, multiple redundancies are implemented to account for various emergency situations, such as the emergency team not being able to respond in time, for example.

In embodiments, the system 100 includes automation for several aspects of the simulation. The automation includes consistent speed and reliable speed adjustment of the device 102 entering the water, for example. Similarly, the safety features of the safety system 120 can be activated automatically in response to signals from the plurality of sensors 110 and/or when a first predetermined amount of time has elapsed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An immersion simulation system comprising:
a simulation training device comprising
a containment structure having a first end and a second end, the containment structure of a size to accommodate at least one human contained therein,
a first set of wheels mounted to the first end of the containment structure, the first set of wheels coupling the simulation training device to a track and configured to permit the simulation training device to pivot relative to the track,
a second set of wheels mounted to the second end of the containment structure, the second set of wheels configured to releasably engage with the track, and
a first opening configured for human egress from the simulation training device;
the track comprising
a first portion, positioned at a first level above a surface of water, that defines a starting position for the simulation training device, and
a second portion, positioned at a second level below the surface of the water, that defines an ending position the for the simulation training device, and
an intermediate portion between the first portion and the second portion;
wherein the intermediate portion of the track is situated to comprise at least one angle relative to the surface of the water.

2. The system of claim 1, wherein the simulation training device further comprises netting that covers at least a portion of the simulation training device, the netting being at least partially secured to the device in a releasable manner.

3. The system of claim 1, further comprising a sliding door disposed on the simulation training device, the sliding door being operable to open and close the first opening.

4. The system of claim 1, further comprising at least one safety device selected from the group consisting of:
at least one flotation air bag that when inflated is operable to cause the simulation training device to move from the ending position towards the starting position;
at least one light that is activated in response to a signal received from a sensor and/or an electronic control device;
a seat belt with an actionable release mechanism that is activated to release in response to a signal received from a sensor and/or from an electronic control device; and
a sliding door disposed on the simulation training device, the sliding door being operable to open and close the first opening in response to a signal received from a sensor and/or from an electronic control device.

5. A system for providing simulation training to a trainee while at least partially submerged in water, the system comprising:
a simulation training device comprising a containment structure having a first end and a second end, the containment structure of a size to accommodate at least one human contained therein;
a track, a first portion of the track having a first end that is not submerged in the water, wherein the first end of the track defines a starting position of the simulation training device, a second portion of the track having a second end that is submerged in the water, wherein the second end of the track defines an ending position of the simulation training device;
a plurality of wheels supporting the simulation training device, a first set of wheels supporting the first end of the containment structure, the first set of wheels being hingedly connected to the track, and a second set of wheels supporting the second end of the containment structure, the second set of wheels being releasably connected to the track;
a winch system configured to retrieve the simulation training device from the ending position;
a plurality of sensors;
one or more safety features; and
circuitry configured to
cause the simulation training device to begin moving on the track from the starting position toward the ending position,
activate a timer when the simulation training device contacts water,
determine if a sensor output is within a predetermined range, provide an alert signal if the sensor output is not within the predetermined range, determine when a simulation training session is completed, and activate the winch system in response to the simulation training session being completed.

6. The system of claim 5, wherein the circuitry is configured to determine when a first predetermined amount of time has elapsed, provide an alert signal in response to the first predetermined amount of time elapsing, activate the one or more safety features in response to the first predetermined amount of time elapsing, determine when a second predetermined amount of time has elapsed, wherein the second predetermined amount of time is greater than the first predetermined amount of time, and activate the winch system to retrieve the simulation training device from the ending position in response to the second predetermined amount of time elapsing.

7. The system of claim 5, wherein the simulation training device further comprises a netting that covers at least a portion of the simulation training device.

8. The system of claim 5, wherein the simulation training device comprises a sliding door configured to allow a user a first exit from the simulation training device.

9. The system of claim 8, wherein the simulation training device further comprises an opening in a top of the containment structure, the opening providing a second exit from the simulation training device.

10. The system of claim 5, wherein the one or more safety features are selected from the group consisting of at least one flotation air bag configured to raise the simulation training device from below the surface of the water and to ascend to the surface of the water, at least one light that is activated in response to a signal received from the sensor and/or an electronic control device, at least one seatbelt and a seatbelt release mechanism coupled to the at least one seatbelt, the seatbelt release mechanism configured to disconnect the at least one seatbelt in response to a signal received from the sensor and/or an electronic control device, a netting and a netting release mechanism coupled to the netting, the netting release mechanism configured to disconnect the netting from the simulation training device in response to a signal received from the sensor and/or an electronic control device, a sliding door and a sliding door mechanism coupled to the sliding door causing the sliding door to open in response to a signal received from the sensor and/or an electronic control device.

11. The system of claim 5, wherein the plurality of sensors are selected from the group consisting of an oxygen sensor, an imaging device, an accelerometer, a water detection sensor, and combinations thereof.

12. The system of claim 5, wherein the track includes one or more adjacent track segments, a transition from each of the one or more track adjacent segments to an adjacent track segment defining one or more angles adjustable to a predetermined angle.

13. The system of claim 5, further comprising a remote-control system that remotely operates one or more of the safety features, the plurality of wheels, and the winch system.

14. The system of claim 5, wherein at the ending position of the simulation training device the first end of the containment structure is perpendicular to a surface of the water via the hingedly connected first set of wheels and the releasably connected second set of wheels.

15. The system of claim 5, wherein one or more of the plurality of wheels is coupled to a motor configured to rotate one or more of the plurality of wheels.

16. The system of claim 5, wherein the water comprises a pool of water.

17. The system of claim 1, further comprising a winch configured to control the speed of the training device as the device travels on the track from the starting position to the ending position and configured to move the device from the ending position to the starting position.

18. The system of claim 1, further comprising a second opening configured for human egress from the device.

19. The system of claim 5, wherein the winch system is further configured to return the simulation training device to the starting position.

20. The system of claim 12, further comprising a remote-control system that remotely operates an adjustment of the one or more angles.

* * * * *